(12) United States Patent
DiGennaro

(10) Patent No.: US 7,546,707 B1
(45) Date of Patent: Jun. 16, 2009

(54) PORTABLE FLOOR

(75) Inventor: Ernest DiGennaro, Thousand Oaks, CA (US)

(73) Assignee: California Portable Dance Floor Company, Inc., Camarilo, CA (US)

( * ) Notice: Subject to any disclaimer, the term of this patent is extended or adjusted under 35 U.S.C. 154(b) by 190 days.

(21) Appl. No.: 11/561,606

(22) Filed: Nov. 20, 2006

Related U.S. Application Data

(63) Continuation of application No. 29/248,685, filed on Aug. 29, 2006, now Pat. No. Des. 558,358.

(51) Int. Cl.
*E04F 11/16* (2006.01)

(52) U.S. Cl. .................. 52/177; 52/127.7; 52/220.2; 404/34

(58) Field of Classification Search ............. 52/127.7, 52/177, 220.2, 403.1, 591.1, 589.1, 590.1, 52/590.2, 590.3; 404/41, 34, 35, 36, 45
See application file for complete search history.

(56) References Cited

U.S. PATENT DOCUMENTS

| 968,512 | A | | 8/1910 | Praray | |
|---|---|---|---|---|---|
| 3,310,919 | A | | 3/1967 | Bue et al. | |
| 3,349,533 | A | | 10/1967 | Gregoire | |
| 3,487,756 | A | * | 1/1970 | Glaza et al. | 404/38 |
| 3,859,000 | A | * | 1/1975 | Webster | 404/41 |
| 4,067,155 | A | * | 1/1978 | Ruff et al. | 52/105 |
| 4,901,485 | A | | 2/1990 | Menchetti et al. | |
| 5,022,200 | A | | 6/1991 | Wilson et al. | |
| 5,070,662 | A | | 12/1991 | Niese | |
| 5,657,598 | A | * | 8/1997 | Wilbs et al. | 52/287.1 |
| 6,093,469 | A | * | 7/2000 | Callas | 428/95 |
| 6,128,881 | A | * | 10/2000 | Bue et al. | 52/582.2 |
| 6,187,394 | B1 | | 2/2001 | Johnson et al. | |
| 6,189,283 | B1 | * | 2/2001 | Bentley et al. | 52/587.1 |
| 6,550,192 | B1 | * | 4/2003 | Nelson et al. | 52/177 |
| 6,584,739 | B2 | * | 7/2003 | Zeif | 52/263 |
| 2004/0093811 | A1 | * | 5/2004 | Oakey et al. | 52/177 |
| 2006/0130378 | A1 | | 6/2006 | Rybalov | |

\* cited by examiner

*Primary Examiner*—Richard E Chilcot, Jr.
*Assistant Examiner*—Anthony N Bartosik
(74) *Attorney, Agent, or Firm*—Ralph D. Chabot

(57) ABSTRACT

A portable dance floor is disclosed. The portable dance floor is comprised of floor panels which are fitted together with a tongue and groove locking method well known in the art. Each floor panel has a base layer, a transparent top flooring layer and a sheeting layer disposed therebetween. The top flooring layer is preferably made of a clear acrylic sheet having suitable physical characteristics capable of supporting the weight of individuals thereupon. Each floor panel is designed so that the sheeting layer can be removed and replaced with a different sheeting layer which can comprise a holographic top surface or a light capable display which is viewable through the transparent top flooring layer.

5 Claims, 2 Drawing Sheets

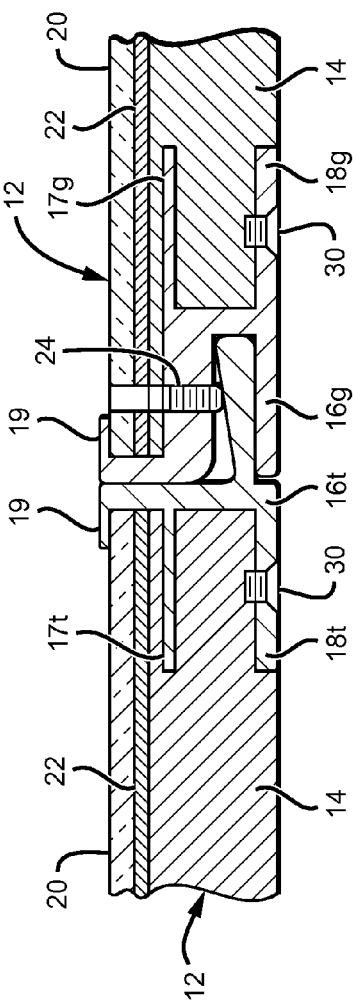
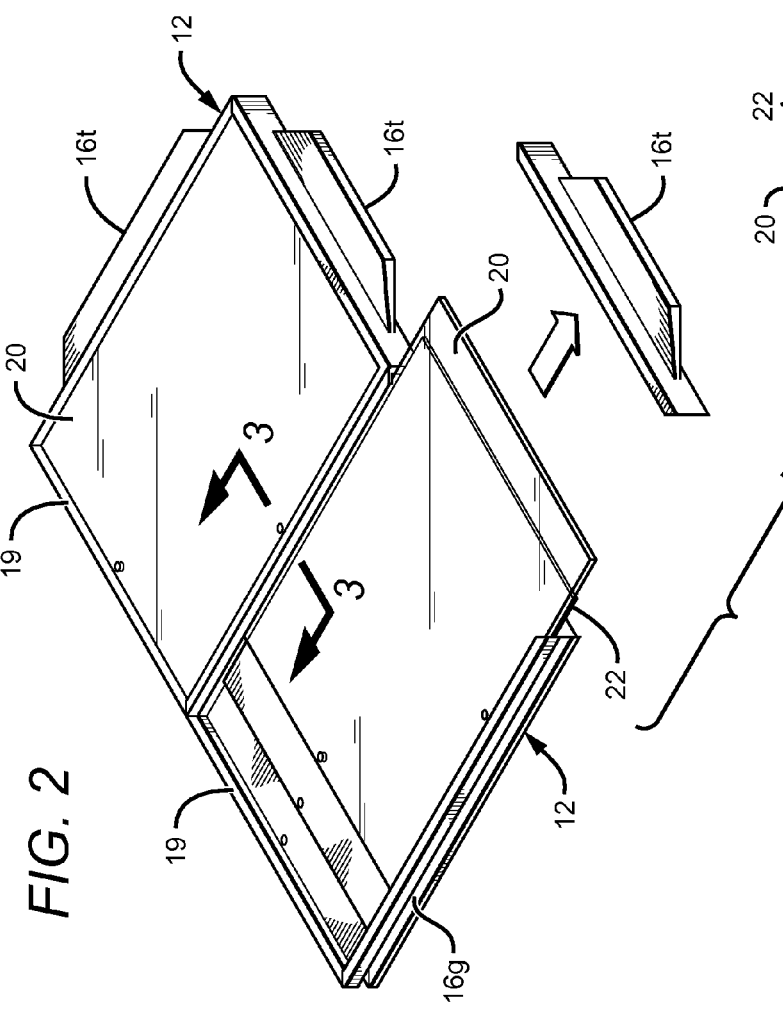

PORTABLE FLOOR

PRIORITY CLAIM

This application claims the benefit of U.S. Design Application No. 29/248,685, filed Aug. 29, 2006, the content of which is hereby incorporated by reference herein in its entirety for all purposes.

BACKGROUND OF THE INVENTION

This invention relates to portable floors and more specifically, to portable floors formed from a plurality of interconnecting, floor panels preferably joined by a tongue and groove coupling mechanism.

Portable floors have existed for many years. U.S. Pat. No. 3,310,919 issued to Bue et al. discloses a lockable tongue and groove structure for connecting adjacently situated floor panels. This locking structure includes a groove or channel element associated with one floor panel and a tongue element associated with an adjacent floor panel. Access holes are provided in the floor panels situated along the length of the panels above the groove elements. These access holes are aligned to correspond with bores made through an upper leg portion of the channel element. An externally threaded set screw is inserted from above the dance floor surface into each access hole and aligned with the bore until the bottom of the set screw contacts and compresses the inserted tongue, thus locking the floor panels together. Typically, the tongue has a thick forward end and is tapered rearwardly to a thinner cross-section at its juncture with the floor panel on which it is mounted.

Another prior art example of portable floors, U.S. Pat. No. 5,070,662 issued to Niese incorporates the tongue and groove lockable sections of Bue et al. along with the use of a metal insert having a flared bottom end which is disposed within the bore of each access hole. The flared bottom end, along with a set screw was alleged to prevent stripping of the threads associated with previous tongue and groove locking devices.

A third prior art example of portable floors, U.S. Pat. No. 6,128,881 issued to Bue et al. discloses a plurality of tapered rectangular edge trim panels adapted for connection to the periphery of the dance floor to form an extended floor surface. This prior art uses the tongue and groove locking mechanism not only for floor panel connections but also with the trim panels to form a tapered border about the periphery of the dance floor to prevent not only warping of the dance floor but also to prevent individuals from tripping when stepping onto or off-from the dance floor.

A fourth prior art example is U.S. Patent Application Publication by Rybalov, US 2006/0130378 published Jun. 22, 2006. The Rybalov publication illustrates a floor advertising means whereby a light diffusion plate is arranged between a light source and a top translucent panel. In this way, advertising and information images disposed on the surface of the light diffusion plate, can be viewed through the top panel.

Portable flooring are typically formed of a plurality of floor panels. Each panel itself is typically constructed of a base layer, preferably made of plywood or other material for providing stability and support for a top layer, the surface of which is used for individuals to dance or walk upon. As a result, each sectional panel is relatively heavy.

While it is possible to interchange floor panels having different top surfaces to create a different dance floor surface appearance, realistically, because of the size and weight of each floor panel, it is not economical for a consumer to purchase additional panels which may not be adequately used as well as the additional storage space requirements.

Accordingly, it is an object of this invention to provide the ability to alter the surface appearance of a portable floor without requiring the purchase of additional floor panels which have a top surface permanently attached to a base layer.

A further objective of this invention is the ability to alter the surface appearance of a portable floor in a time efficient manner.

SUMMARY OF THE INVENTION

The portable floor of the present invention provides a temporary floor surface that permits the surface appearance to be changed without requiring the need to purchase or maintain inventory of additional floor panels.

My portable floor is comprised of a plurality of connectable floor panels, preferably 4-sided and most preferably, rectangular. Each floor panel has a structural supporting base layer preferably made of plywood. These floor panels are connected along their edges to form a portable floor.

In a preferred embodiment, each floor panel includes a top flooring layer; a sheeting layer disposed between the top flooring layer and base layer; and, four elongated framing elements that are attached around the periphery of a respective base layer, one per side, and having mitered ends, i.e. forty five (45) degree angled ends that are complementary to form a right angled corner with the framing elements of the same floor panel on either adjacent side.

Each floor panel is temporarily attached to adjacent floor panels or peripheral trim panels using tongue and groove locking mechanisms. Each floor panel includes two framing elements having a horizontally extending tongue and two framing elements having complimentary groove for receiving the tongue of an adjacent panel.

My portable floor uses a transparent top flooring layer which is sufficiently durable to withstand foot traffic and dancing while still permitting an image or design on the top surface of the sheeting material to be viewable. The top flooring layer is made of a sufficiently thick and durable layer of transparent acrylic, plexiglass, tempered glass, or other translucent material.

However, rather than have the top flooring layer adhesively bonded or otherwise permanently attached to the base layer, at least one of the floor panels of my portable floor permit removable of a sheeting layer disposed between the base layer and the top flooring layer. This removable sheeting layer can have a top surface of any desired color, pattern or design. By way of example only, the sheeting layer can be paper, metallic or photo film and the top surface could be black matte, or it can have a top surface which is holographic, or it can be designed to illuminate using light emitting diodes or neon lights operably connected to a power source.

Therefore, the same base layer and transparent top flooring layer can be used while the sheeting layer disposed therebetween can be replaced as desired. In this way, additional storage is only necessary for other/replacement sheeting layers.

For each framing element on a floor panel having a complimentary groove, a hole having a common axis of symmetry is provided, extending from the top flooring layer, through the sheeting layer and base layer and threaded through the top wall of the framing element. A set screw is thereafter provided, the length of which does not protrude from the top surface of the top flooring layer when the set screw is in frictional engagement with the tongue of an adjacent panel within the groove.

In my preferred embodiment, each floor panel is constructed so that one of the four framing elements is capable of being temporarily detached and the other three framing elements are permanently attached to the base layer. In this way, the sheeting material and top flooring layer can be removably slid away from contact with the remaining framing elements.

Each of the four framing elements include an elongated top lid portion vertically distant from the top surface of the base layer and which extends horizontally a short distance over its respective floor panel. The space bounded by the top lip portion and base layer surface defines a channel. The vertical distance between the top surface of the base layer and the bottom surface of the top lip portion is sized so that the channel will accept the combined wall thickness of the sheeting layer and the top flooring layer snugly. Thus, the periphery of the top flooring layer is substantially disposed underneath the top lip portions of the four framing elements. In this way, when the top flooring layer is properly in position, the top lip portions preclude vertical removal of the top flooring layer.

The sheeting layer and the top flooring are dimensionally sized to be positioned upon the top surface of the base layer so that their peripheral edges extend within the channels formed by the top lip portions of the four framing elements. In other words, once the sheeting layer and the top flooring layer are in position within the channels formed on three sides, the detached framing element is then attached; thus completing the floor panel. The floor panel is now in a condition to be connected with other adjoining floor panels or the peripheral trim panels. Where peripheral tapered edge trim panels are to be used, corner panels should also be provided having complimentary ends.

Using a transparent top flooring layer, by changing the sheeting layer present in at least one floor panel, the viewable design of the dance floor can be changed to suit the mood of a particular event. By example, one even may require a holographic appearance while another event may require a black matte appearance. Instead of stocking multiple panel sections of varied appearance, all that is necessary is to have the desired sheets and the labor to install.

BRIEF DESCRIPTION OF THE DRAWINGS

FIG. 2 is a perspective view of two connected floor panels with one of the floor panels illustrated in an exploded view.

FIG. 3 is a view taken along line 3-3 of FIG. 2.

DETAILED DESCRIPTION OF THE PREFERRED EMBODIMENT

Figure 1:
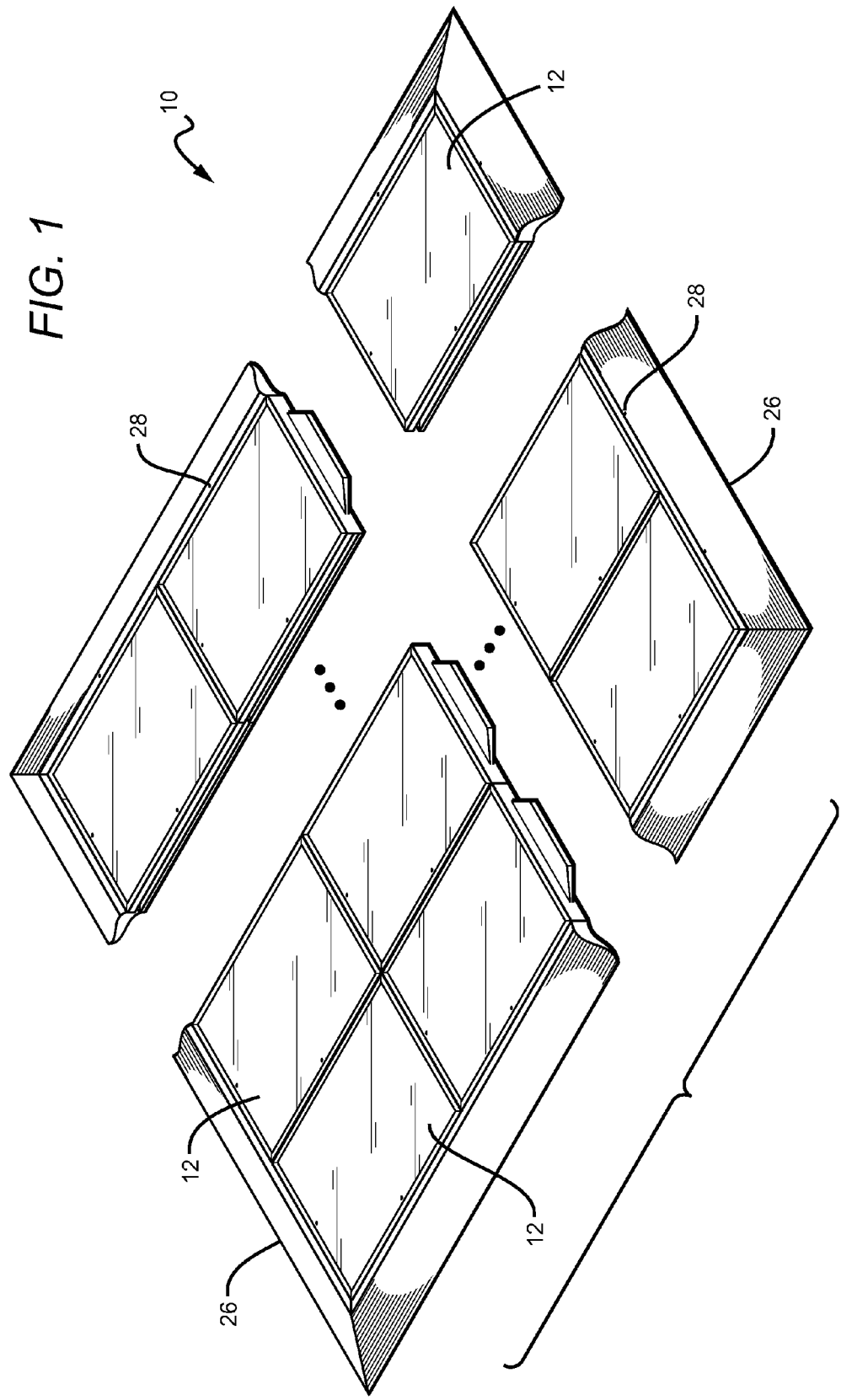
FIG. 1 is a perspective view of the portable floor comprising a plurality of floor panels and trim panels.

FIG. 1 illustrates the make-up of my portable floor 10 which is comprised of multiple floor panels 12. It is to be understood that any number of rows of floor panels 12 can be assembled to form the desired size of portable floor subject to the dimensions of the floor panels used. Typically, the dimensions of the floor panels are 4 feet by 3 feet.

As better viewed in FIG. 2 and FIG. 3, each floor panel comprises a base layer 14, and four framing elements attached, one on each peripheral side.

Each floor panel 12 is rectangular, with a preferred dimension of 3 ft×4 ft. Base layer 14 is made of plywood for structural support and the framing elements are made from extruded aluminum.

One of the four framing elements is detachable from its respective floor panel 12 as shown in FIG. 2. When detached, top flooring layer 20 and sheeting layer 22 can be removed and then replaced with the same top flooring layer and a different sheeting layer having a different top surface design. In this way, some or all of the floor panels 12 can have their respective sheeting layer 22 replaced with a sheeting layer having different top surface designs.

Two of the framing elements are tongue framing elements 16t and the other two are groove framing elements 16g. Each of the groove framing elements 16g further comprise a threaded hole for accepting a complimentary set screw 24 for locking adjacent framing elements 16t and 16g into position as illustrated in FIG. 3.

Framing elements 16g and 16t utilize respective upper arms 17g and 17t, and respective lower arms 18g and 18t as well as an elongated top lip 19. Each top lip 19 extends horizontally in a direction opposite of the adjacent panel section.

Upper arms 17t and 17g and lower arms 18t and 18g are secured to the base layer 14 of respective floor panel 12. Base layer 14 is preferably constructed from plywood. Base layer 14 comprises a peripheral groove appropriately sized to accept the upper arm 17g or 17t of either framing element.

Further, below the peripheral groove, each base layer 14 has a reduced vertical wall thickness. This reduced wall thickness is substantially the wall thickness of the lower arm 18t and 18g of the framing element intended to be attached. In this way, when the tongue or groove framing elements are fitted to base layer 14, the exposed bottom surfaces of both the framing element and base layer 14 are substantially flush with one another, thereby providing a uniform flat surface.

Screws 30 can be threaded through respective lower arms 18t and 18g in order to secure the respective framing element to base layer 14. Additionally, it is preferable that three of the four framing elements of floor panel 12 are permanently attached to base layer 14 either by adhesive or other means.

Each upper arm, 17t or 17g, when inserted into the groove of base layer 14, fits snugly. Although an alternative embodiment to the peripheral groove would be routing or otherwise reducing the wall thickness of the base layer 14, this is undesirable since it would create a non-uniform top surface upon which the sheeting layer 22 would be disposed. A non-uniform surface may cause unnecessary and undesired damage to sheeting layer 22.

As mentioned earlier, the framing elements include an elongated top lip 19 which extends horizontally inward. Therefore, each framing element 16t and 16g is appropriately dimensioned so that the spacing between its upper arm and top lip 19 is sufficient to not only accept the thickness of base layer 14 above the upper arm, but also provides the necessary space for receiving the combined thickness of top flooring layer 20 and sheeting layer 22.

In a preferred embodiment, floor panels 12 are rectangular in dimension. Three of the four framing elements are bonded or otherwise permanently secured to the base layer. The fourth framing element, preferably located on one of the short sides of rectangular shaped floor panel 12, is detachable. The reason for removability will now be discussed.

When three of the four framing elements are secured to base layer 14, a top channel is formed, being defined as the space between the top lips 19 of the three framing elements, and the top surface of base layer 14. Sheeting layer 22 having an upper surface design intended for viewing as a dance floor is provided, having appropriate dimensions for covering substantially the entire top surface of base layer 14 and fitting within the top channels of the respective floor panel 12. Sheeting layer 22 can have any design desired, including holographic or the ability to provide lighting. In the case of lighting, appropriate electrical connections must be provided to connect to an adjoining floor panel, preferably joined in series and connected to a power source.

Further, the top channel discussed above, is appropriately sized to accept the combined thickness of sheeting layer 22 and top flooring layer 20, the top surface of which is the substantial dance floor. Top flooring layer 20 must be of sufficient thickness to bear the weight of individuals dancing upon its surface. yet must also be sufficiently transparent so that sheeting layer 22 immediately below can be viewed. Preferably, top flooring layer 20 is made of a plexiglass material although any other plastic or acrylic material is suitable so long as it meets the conditions expressed earlier in this paragraph.

In practice, with a short side framing element temporarily detached, top flooring layer 20 and sheeting layer 22 can be slid into position. Once top flooring layer 20 and sheeting layer 22 are in position, the detached framing element can be reattached.

It is preferable to have a short side removable since this allows top flooring layer 20 and sheeting layer 22 to be positioned more easily. However, for purposes of my invention, one can also use a detachable long side framing element.

Because it is necessary to lock adjoining floor panels, use of the set screws described earlier requires that top flooring layer 20 and sheeting layer 22 each have a hole having a common axis of symmetry with each hole present in framing elements 16g as best illustrated in FIG. 3. Because there are two framing elements 16g comprising each floor panel 12, it will be necessary for there to be at least two holes in each top flooring layer 20 and sheeting layer 22 so that respective set screws can be used to temporarily secure an adjacent panel having a tongue framing element 16t positioned for engagement.

The vertical wall thickness of top lip 19 should only be as necessary for providing structural support. Excessive thickness will create a noticeable difference in height between the surface of top flooring layer 20 and top lip 19 which could cause tripping of an individual. Accordingly, the framing elements are constructed from a suitable material for providing the necessary structural support. In my preferred embodiment, the material selected is extruded aluminum.

Once the portable floor is assembled, it would be preferable to include transitional edge trim panels 26 as disclosed in prior art reference Bue et al. discussed earlier. These trim panels would incorporate either a groove to engage the edges of a floor panel having a tongue or they would have a tongue to be received within the edges of a floor panel have a complementary groove. Threaded holes 28 would be used to secure groove framing elements 16g of adjacent floor panels 12 by set screws in a similar manner to that shown in FIG. 3 for securing floor panels.

I claim:

1. A portable floor having a plurality of connectable floor panels, each floor panel having a base layer that includes a top surface and a groove along each peripheral side of the base layer, each said floor panel further having about each of its four peripheral sides a framing element capable of connecting to a framing element of an adjacent floor panel, each framing element having an upper arm adapted to be slidably received within the respective groove, the improvement comprising:

at least one of said floor panels further comprising a slidably removable sheeting layer having a top surface, and a slidably removable transparent top flooring layer;

each framing element further comprises an elongated top lip portion vertically distant from the top surface of said base layer, said top lip portion extending horizontally across a portion of said base layer, the space between said top lip portion and said base layer defining a channel adapted for receiving a portion of said removable sheeting layer and a portion of said transparent top flooring layer;

at least one of said floor panels having one of said framing elements capable of being temporarily detached for insertion or removal of said removable sheeting layer and said transparent top flooring layer;

said removable sheeting layer sized to be substantially disposed upon the top surface of the base layer; and, said transparent top flooring layer substantially disposed upon the top surface of said removable sheeting layer.

2. The portable floor of claim 1 further comprising a plurality of tapered edge trim panels, each trim panel attached to a respective floor panel.

3. The portable floor of claim 1 further comprising a set screw having a head and a distal end portion and at least one hole in said slidably removable sheeting layer and said slidably removable transparent top layer for a respective said floor panel having a common axis of symmetry with each other when inserted within said channel, said holes are further positioned to have a common axis of symmetry with a threaded hole in one of the framing elements for said set screw to be disposed through said holes, frictionally engage said threaded hole of the framing element and the distal end of said set screw engages a tongue of a framing element of an adjacent floor panel after a tongue arm is slidably received into a groove of the framing element.

4. A portable floor system comprising:

a plurality of floor panels connected along their edges to form a portable floor; each of said floor panels further comprising four framing elements having a top lip portion;

each of said floor panels further comprises a slidably removable transparent top flooring layer and a slidably removable sheeting layer which is disposed beneath said top flooring layer, where the periphery of said slidably removable transparent top flooring layer is substantially disposed underneath said top lip portions;

the portable floor system further comprising a set screw having a head and a distal end portion and at least one hole in said slidably removable sheeting layer and said slidably removable transparent top layer for a respective said floor panel having a common axis of symmetry with each other when inserted within said channel, said holes are further positioned to have a common axis of symmetry with a threaded hole in one of said framing elements for said set screw to be disposed through said holes, frictionally engage said threaded hole of said framing element and the distal end of said set screw engages a tongue of a framing element of an adjacent floor panel after a tongue is slidably received into a groove of said framing element.

5. A floor panel for use as a portion of a portable floor, the floor panel comprising:

a base layer having a top surface and four peripheral sides;

a framing element attached to a respective peripheral side; said framing elements each having a top lip portion, and a space between the top lip portion and the top surface of said base layer, each said top lip portion respectively extends horizontally across a portion of the top surface of said base layer; wherein a peripheral channel is formed by the space bounded by said top lip portion and the top surface of said base layer; said framing elements adapted to be connected to framing elements of adjacently positioned floor panels to form a portable floor; and, at least one of said framing elements adapted to be temporarily removed from and subsequently reattachable to a respective base layer; the floor panel further comprising a slidably removable transparent top layer and a slidably removable sheeting layer disposed between said transparent top layer and said base layer where both said slidably removable transparent top layer and said slidably removable sheeting layer are of appropriate length and width so that their respective peripheral edges extend to within each of said channels and are removable when said at least one of said framing elements is temporarily removed from said base layer.

* * * * *